United States Patent [19]

Schroeder et al.

[11] Patent Number: 4,773,008
[45] Date of Patent: Sep. 20, 1988

[54] ENVIRONMENTAL CONTROL OF AN AQUARIUM

[76] Inventors: Rondon L. Schroeder, Rte. 1, Box 110, Loon Lake, Wash. 99148; Bernie R. Goheen, HCR 1, Box 524, Springdale, Wash. 99173; Robert D. Nasby, 6912 Edwina NE., Albuquerque, N. Mex. 87110

[21] Appl. No.: 882,951

[22] Filed: Jul. 7, 1986

[51] Int. Cl.⁴ ............................................. G06F 15/20
[52] U.S. Cl. ........................................ 364/400; 119/5; 210/169; 364/146; 364/172; 364/557; 364/413.01
[58] Field of Search ................ 346/146, 147, 140–145, 346/509, 510, 418, 400, 557, 172; 119/5, 14.08, 14.14; 210/169

[56] References Cited

U.S. PATENT DOCUMENTS

| | | | |
|---|---|---|---|
| 3,949,241 | 4/1976 | Maute | 119/5 X |
| 4,115,263 | 9/1978 | James | 210/169 X |
| 4,322,297 | 3/1982 | Bauka | 210/169 X |
| 4,386,649 | 6/1983 | Hines et al. | 364/145 X |
| 4,523,460 | 6/1985 | Strickler et al. | 364/509 X |
| 4,527,246 | 7/1985 | Masson | 364/145 X |

OTHER PUBLICATIONS

Fay–"Microcomputer Control of Fluctuation Conditions for Experimental Seawter Tanks"–Conference; Colloquium on Microprocessors in the Marine Industry, London, Eng. (4–16-82), pp. 4/1–4/5;

Primary Examiner—Joseph Ruggiero
Attorney, Agent, or Firm—William J. Miller

[57] ABSTRACT

Apparatus for controlling the environment of a tank adapted to be filled with water where the tank includes a plurality of control apparatus. The invention specifically utilizes a microprocessor having a plurality of control signal inputs and a plurality of control signal outputs. Apparatus is provided for coupling each of the control signal outputs to each of the plurality of control apparatus. A program device is coupled to the microprocessor signal input such that data can be entered for the control of each of the plurality of control signal outputs and a timing apparatus is likewise coupled to one of the plurality of signal inputs in a manner to allow the microprocessor to calculate the time of day such that data entered by the program device will selectively control the function of each of the control apparatus as necessary to maintain the environment within the limits set by the operator.

4 Claims, 3 Drawing Sheets

ENVIRONMENTAL CONTROL OF AN AQUARIUM

BRIEF DESCRIPTION OF THE PRIOR ART

The best known prior art known to applicant is U.S. Pat. No. 4,196,695, titled "Aquarium Life Support System", issued to Ralph A. Zupo. In that patent, an aquarium life support system has a centrally mounted unit which contains the pump, the filter and all necessary elements including the heater for the aquarium. However, each of the devices is individually controlled by the operator as necessary for maintaining the environment. The heater unit has its own individual thermostat which turns the heater on or off depending upon the preset temperature. The pump has a plug-in apparatus which provides continuous pumping for the unit.

Semi-automatic devices have been used in automatic milking systems as illustrated in U.S. Pat. No. 4,064,838, issued to Ladislav Mukarovsky, et al. In that system a multiple detector which yields a plurality of output signals individually indicative of the milk flow rate after suction is applied to the teat cups, the electrical conductivity of the flowing milk and the temperature of the flow. The signal indicative of the flow rate is coupled to the input of a threshold-operated amplifier, which provides an output pulse to the input of a delay circuit when the signal indicative of the flow rate falls below a predetermined value. The delayed controlled pulse is applied to a suction regulator for the teat cups to terminate the suction on the milk glands. Thus, the above patent relates to an automatic system for providing suction for removal of milk from a cow and termination of the suction once the milk has been removed. It does not disclosed any method for temperature control nor regulation of the environment.

Another patent relating to unitary integral aquariums is U.S. Pat. No. 3,232,272, issued to G. Dosamantes De Jose et al. This patent basically illustrates an aquarium that has all of the necessary heaters, pumps, filters, etc. contained in a single unit. It does not provide for any control of these units in a manner to insure the environment over an extended period of time.

BRIEF DESCRIPTION OF THE INVENTION

This invention basically relates to an apparatus for continually monitoring and controlling the environment of a tank filled with water over an extended period of time. The tank generally contains a heating or cooling device, a pump, a dispensing apparatus, a light and any other desired apparatus such as PH, chlorine, salt determination apparatus and the like.

The tank is continuously controlled by a microprocessor which has a plurality of signal inputs and plurality of signal outputs. Each of the signal outputs is coupled to one or more of the control apparatus; while the signal input is controlled by a program device such as a keyboard or a ROM which will provide a program input to the microprocessor in a manner so that the microprocessor can control throughout the day and throughout the week various necessary commands to the temperature control apparatus, to the pump, to the dispensing apparatus, to the light and to other control apparatus in the tank in a manner to insure that the tank has a proper environment at all times.

DETAILED DESCRIPTION OF THE INVENTION

The following describes an aquarium control system with a heater, but it is obvious that the invention would apply to such things as an aquarium with a cooling device or other tank of water.

Figure 1:
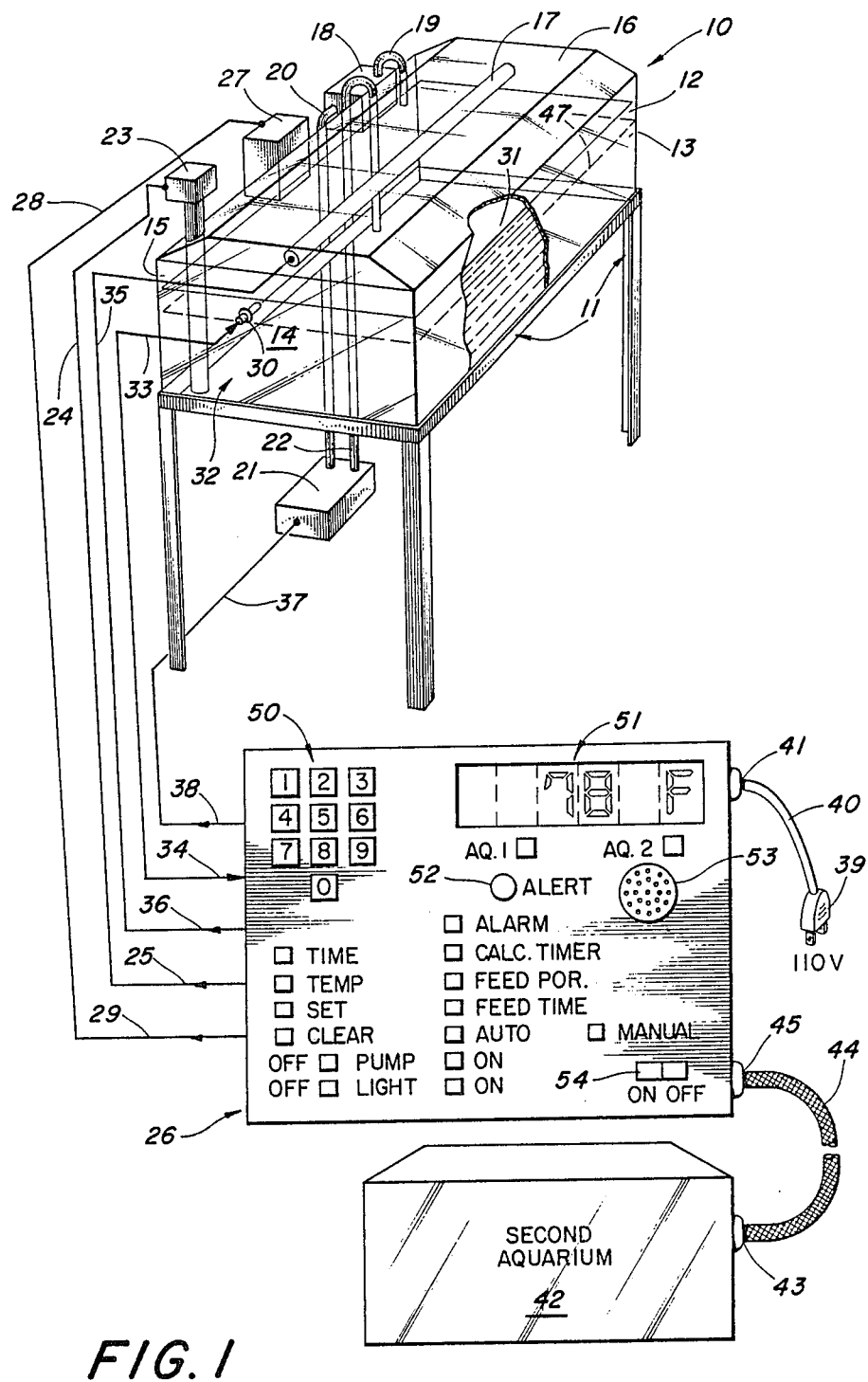
FIG. 1 illustrates an aquarium having the various control apparatus inserted therein along with the control arrangement for the microprocessor control circuit for maintaining the environment within the tank over an extended period of time.

Referring to all of the Figures but in particular to FIG. 1, a tank 10 is normally mounted on a leg supported stand 11 and generally comprises four transparent walls 12, 13, 14 and 15. Normally tank 10 is enclosed by a removable top 16 which will have a fluorescent light or incandescent light 17 mounted thereunder. Mounted beside the tank is one form of filtering apparatus 18 which has a pipe 19 for removing material to be filtered into filter 18 and a pipe 20 which is coupled to pump 21. The return for pump 21 is provided through a pipe 22 to the bottom of the tank for returning water usually in the form of aerated water to the tank, such is well known in the art and is not part of this invention. The tank may also contain a temperature control device such as a heater 23, which will be coupled through wire means 24 to a control output 25 of a control system generally referred to by arrow 26. An automatic feeding device 27 is likewise connected through a wire means 28 to a control output 29 of control system 26. A thermistor 30 is mounted in the tank at a location below the surface 31 of water generally referred to by arrow 32 which, of course, is confined in tank 10 by wall 12, 13, 14 and 15 and a bottom not numbered.

A wire means 33 couples thermistor 30 to a circuit 34 of control system 26. Light 17 is coupled through a wire means 35 to a control output circuit 36. Pump 21 is powered through a wire means 37 to a control output 38 of control system 26. A 110 volt power source is coupled through a plug 39 and wire means 40 to the 110 volt input 41 of control system 26.

In case a second aquarium is desired, such second aquarium 42 may be coupled from its input 43 through a cable 44 to an output 45 of control system 26. It is obvious that cable 44 will contain all of the wires 37, 35, 33, 28 and 24 coupling aquarium number one, and in addition will include a 110 volt power source communicating power from control system 26 to second aquarium 42.

Referring in particular to control system 26, such system includes a keyboard data entry apparatus 50 having a plurality of keys illustrated as being numbered 0 through 9 and other keys having labels such as time, temperature, etc. It likewise contains a display portion 51. Display portion 51, as will be described later in this specification, will display the various functions being entered into control system 26 along with the time of day and pertinent information for setting up and operating a control system. Control system 26 also includes an alert light 52 and may also include a speaker 53 for an audible alarm if desired. The system also includes an on/off switch 54 along with several selected data entry keys represented by squares on the panel of control system 26 along with their function in writing beside the squares. The squares actually represent keys which may be pushed in order to activate the particular function desired. The keys may or may not light when depressed.

Figure 2:
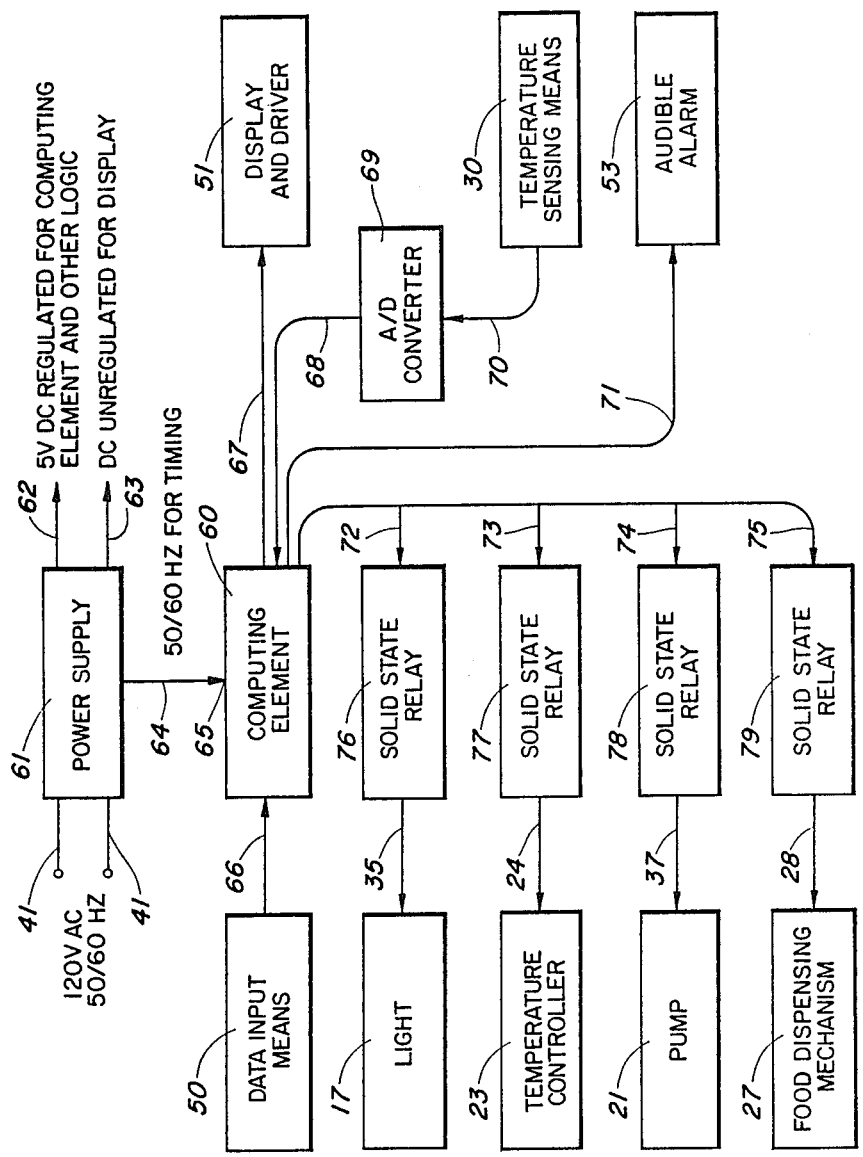
FIG. 2 is a block diagram of the control circuit illustrating the functions of the control circuit.
Figure 3:
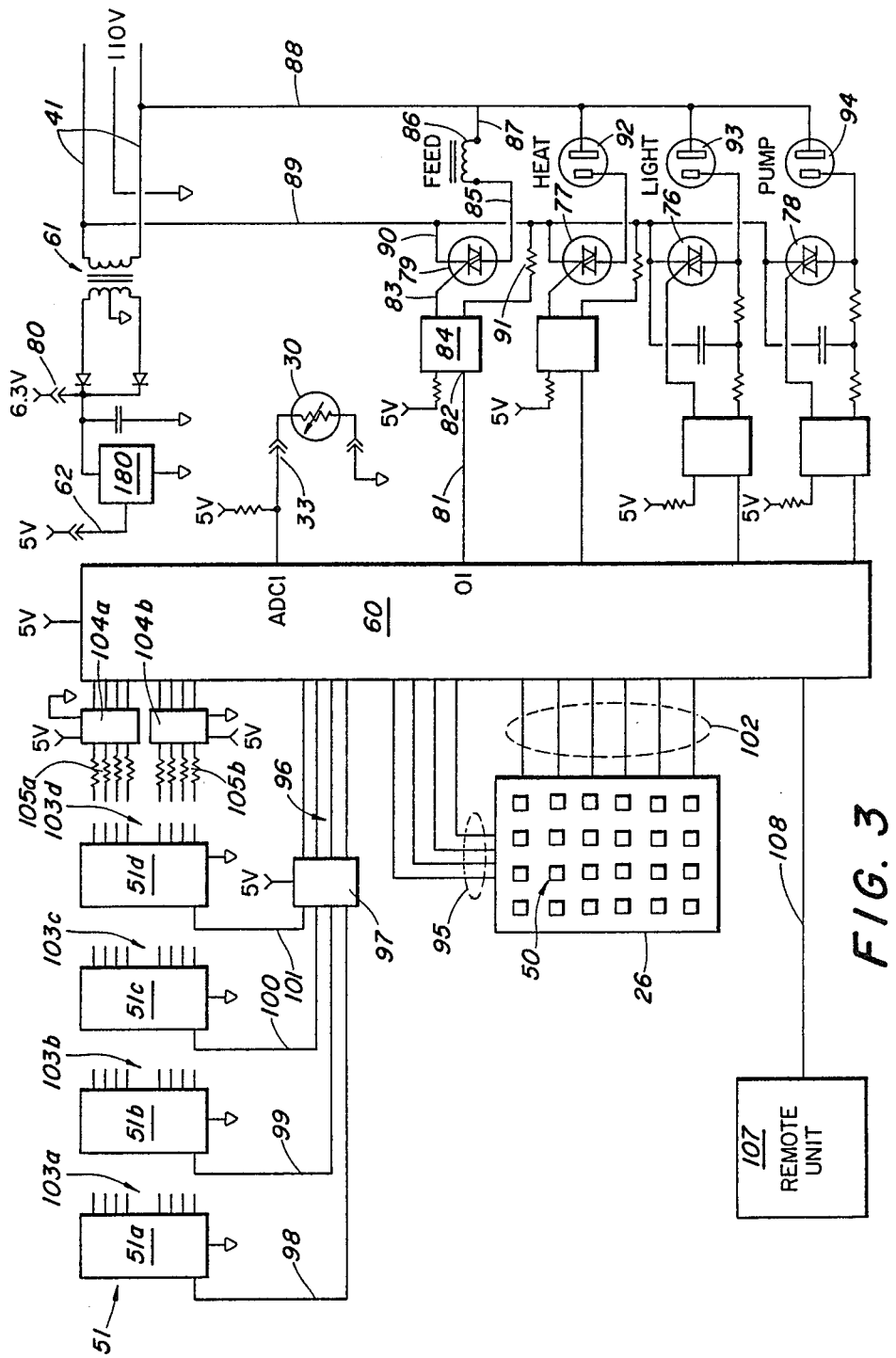
FIG. 3 is a detailed circuit illustrating one embodiment of the invention as constructed.

Referring to FIG. 2, control system 26 is illustrated as a block diagram, so that the function of control system 26 can be better explained. The actual circuitry illustrated in FIG. 2 is illustrated in FIG. 3 and will be discussed at a later portion of this specification.

Referring in particular to FIG. 2, a computer element 60 receives its power from a power supply 61 which has an 110 volt, for example, inlet 41 and supplies 5 volt output regulated at line 62 and a 5 volt DC unregulated at 63 for connection to the display portions of control system 26. The power supply likewise is coupled through a wire 64 which provides 50/60 Hertz for timing, such timing signal is applied to input 65 of computing element 60.

Data input means 50 is illustrated in FIG. 1 as being a keyboard. It is obvious that data input means 50 can likewise be a ROM or other preprogrammed microprocessing unit or chip for inputting the necessary data to computing element 60 through a wire means 66. Computing element 60 has wire means 67 coupled to a display and driver 51. It also provides an input through a wire 68 from an analog to digital converter (A/D) 69 which is subsequently coupled through a wire 70 to temperature sensing means 30. Computer element 60 has another wire means 71 coupled to an audible alarm such as speaker 53. Computer element 60 has a plurality of control outputs coupled through wires 72, 73, 74 and 75 to solid state relays 76, 77, 78 and 79, respectively. Each of the solid state relays 76 through 79 is coupled through a wire means 35, 24, 37 and 28 to the respective control apparatus 17, 23, 21 and 27, respectively, said units being the light, heater, pump and food dispensing mechanisms respectively.

OPERATION

The operation of the system is broadly described with reference made to FIGS. 1 and 2. In order to properly control all of the functions requiring time, an initial time of day must be entered into the microprocessor from control system 26. The time is normally entered by pressing the SET button and the TIME button and then entering the time with keyboard data entry apparatus 50. Finally, the SET button is pressed again to enter the data into the microprocessor. The P.M. may be indicated by pressing the button labeled P.M., which, in the case shown in the illustration, is the 0 button. Provision may be made to cancel the information already entered by pressing the CLEAR button.

The temperature desired for the aquarium is entered by pressing the SET button and the TEMPERATURE button and then entering the data as described for the clock, by pressing the proper keys on the keyboard 50.

The pump is then set by setting the PUMP OFF time or the PUMP ON time and the SET as indicated for the light and the temperature. Furthermore, the LIGHT time ON and time OFF is set similar to the described for the pump.

The system also includes a FEED TIME button, that is the time for actually feeding the fish can be entered. Furthermore, the amount of feed can be set by the FEED POR button, representing the number of portions fed at any feeding time. At anytime a person desires the MANUAL button can be pressed and the system operated manually. It is obvious, of course, the system may have a battery pack for maintaining the memory system alive during power failure or outage of the 110 volt circuit inputted through plug 39 to wire 40 at input 41.

Referring in particular to FIG. 2, in order to control the light, as an example, data input means 50 has inputted through wire 66 to computer element 60 the time of day to turn the light on and the time to turn it off. A signal is transferred through wire 72 during the on period of the light, which operates solid state relay 76, communicating power through wire 35 to light 17 turning the light on. When it is time that the light should be shut off computer element 60 removes the signal to wire 72, shutting solid state relay 76 off, thus, terminating power through wire 35 to light 17. The heater likewise is controlled in the same manner as light 17 by information from computing element 60 being transferred through wires 73 to solid state relay 77, either turning the power on or off to the heater as needed. As a consequence, power is transferred through wire 24 to heater 23 when solid state relay 77 is closed and power is terminated through wire 24 to heater 23 when solid state relay 77 has been opened. The same circuit 78 functions with pump 21 by communicating power through wire 37 and solid state relay 79 turns the food dispensing system on or off by supply power through wire 28 to food dispenser system 27.

One of the unique features of this invention is the method for controlling the heat in tank 10. Basically the temperature is sensed through a thermistor 30. Computer element 60 is connected by wire 68 to A/D converter 69 which senses the current through termistor 30. The current passing through thermistor 30 will correspond to the temperature of the water in tank 10. Furthermore, one can utilize the self-heating aspects of thermistor 30 by forcing more current through the thermistor to determine whether the thermistor is in or out of the water. Thus, referring to FIG. 1, if the water level should drop to a point 47 which is at or below the level of thermistor 30, the rate of heating of thermistor will be greatly varied from that when thermistor 30 is actually immersed in water. If computing element 60 senses that thermistor 30 is not in water, it can activate the audible alarm 53 through wire 71 transmitting a warning to the operator of tank 10 that the water level is below that necessary for the proper environment of the fish contained therein. Furthermore, it has dropped below the level of thermistor 30 so additional water must be added to the tank in order to properly control the heat. The alarm can also be a light 52, as illustrated in FIG. 1. Light 52, for example, can blink rapidly on and off to warn the operator of the condition of the water. It is obvious, of course, that a voice module can also be included to generate a spoken voice indicating to the operator the actual problem with the aquarium, such a voice module is well within the skill of the art and will not be further described.

Pump 21 can be set to operate in almost any mode desired by the operator. For example, during the feeding time the pump operation can be terminated so that the feed will not be sucked up into the filtering system of the aquarium, thereby permitting the food to float along the surface of the water rather being drawn down into the gravel, thereby contaminating the aquarium. This function is selected by pressing AUTO.

Referring to FIG. 3, an embodiment which has been reduced to practice is illustrated. As many numbers as possible will be used for like or similar parts in FIG. 3 as was used in the description of FIGS. 1 and 2. Power supply 61 has a first voltage output 80 labeled 6.3 volts. The voltage is supplied to the circuits as needed. The power supply likewise has a third voltage output labeled 62 which provides regulated 5 volts to all of the computer circuits. Chip 180 provides a regulated power output through wire 62 of 5 volts as indicated.

Each of the circuits for controlling the food dispenser, the heater, the light and the pump are substantially identical, so only one of them will be described. The food dispenser is controlled from an output of microprocessor 60 through a wire 81 to the input 82 of a MOC3009 opto isolator 84 which has an output along wire 83 to a Triac 79; these elements constitute a solid state relay (SSR). The output from triac 79 is through a wire 85 to a control solenoid 86 of automatic feeding device or food dispenser 27. A remaining wire 87 from solenoid 86 is coupled to one side 88 of 110 volt input 41. The other side of 110 volt input 41 is wire 89 which is connected to an input 90 of triac 79.

The only difference between food dispenser connections through a solenoid 86 and the heater light and pump connections is that rather than having a solenoid 86 as illustrated, the wires are connected to plugs 92, 93 and 94 respectively into which the respective apparatus are plugged.

The display elements 51, shown as multiple LEDs, are driven by drivers 104a, 104b, and 97. The outputs 105a and 105b are operatively connected to inputs 103a, 103b, 103c and 103d. Driver 97 is likewise connected to 103a through 103d by output means 98 through 101, respectively. These drivers in turn are controlled by computing element 60 through a plurality of output signals. Keyboard 50, likewise, has a plurality of wires 102, 95, which are coupled to the output circuits of microprocessor 60. In case a second aquarium 42 (see FIG. 3) is desired, then cable 44 is plugged into the output plug 45 and coupled to a remote unit for operating the second aquarium 42 or other environmentally controlled apparatus. The remote unit 107 which is coupled to computing element 60 through wire means 108 will, of course, contain solid state switches along with their corresponding opto isolation chips, feeder solenoid and mechanism and plugs for light, heater and pump.

OPERATION OF FIG. 3

The operation of the circuit shown in FIG. 3 is substantially the same as that previously described with FIG. 2. Thus, if the timing element in microprocessor 60 determines that it is a proper time to operate dispenser 27 (see FIG. 1), then a signal is supplied from the output labeled 01 to the isolation unit 84 with the output from 84 on wire 83 rendering the triac 79 conductive causing current to pass from wire 89 through 90 through triac 79 through wire 85 to solenoid 86 and return through wire 88. Thus, when relay 86 is energized it will cause the dispenser to operate and drop a portion of food into the aquarium. If several portions are called for, the solenoid will be operated several times. The same procedure is followed for each of the heater, light and pump units.

The display units 51a through 51d are well known in the art and their function and operation need not be explained. Wires 95, 102 are scanned by microprocessor 60 to determine which key has been depressed. Only four display units have been illustrated. It is obvious that more than four units can be used as necessary for the proper display of any information inputted into or from microprocessor 60.

In an unit constructed in accordance with this invention microprocessor 60 is a Motorola 6805 R3 microprocessor which contains a built in A/D convertor; regulator chip 80 is a 78MO5; isolation chips 84 are MOC3009 opto isolators; display units 51a through 51d are any type of display desired by the person constructing the apparatus; they can be LED displays or illuminated displays or any other useful method for displaying information. If LEDs are used, then display driver 97 can be a 75492 and units 104a and 104b are 75491. Triac 84 are MAC 3010 or other triacs well known in the art.

CONCLUSIONS

An extremely versatile microprocessor controlled environmental control system has been described and its operation explained using an aquarium as an example. The system provides precise control over the water temperature, feeding time and amounts, pump conditions and light provided for the aquarium. It is obvious also that other elements can be incorporated in precisely the same manner, such as means for measuring the acidity of the water and other useful functions which may from time to time be necessary in other environments. For example, if the water being contained in the aquarium is salt water, then other conditions must be monitored such as the percentage of salt in the water, for example. It is also obvious that charcoal can be dispensed from the dispenser, thereby regulating acidity or salinity.

It is obvious that other modifications and changes can be made using the teachings of this invention as described in the specification and appended claims and still be within the spirit and scope of this invention as described in the appended claims.

What we claim is:

1. Apparatus for the control of the light cycle, temperature, feed and circulation of an aquarium filled with water said water having a surface, comprising:
   (a) microprocessor means having at least a plurality of control input means and a plurality of control output means;
   (b) keyboard means for entering a plurality of functions selectively to each of said plurality of control input means;
   (c) means for measuring the temperature of said water coupled to one of said plurality of control input means;
   (d) temperature control means positioned so as to change the temperature, said temperature control means having an input coupled to one of said plurality of control output means;
   (e) means in said microprocessor for accepting selected temperature data inputted from said keyboard means and comparing said data with said measured temperature and outputting a signal to a control means to control current to said temperature control means until said data and said measured temperature are substantially identical;
   (f) timing means coupled to one of said plurality of control input means of said microprocessor means;
   (g) light means coupled to one of said plurality of control output means of said microprocessor means, said light means positioned in a manner to illuminate said aquarium filled with water;

(h) means for inputting data from said keyboard means to said microprocessor means in a manner to turn on or turn off said light means in accordance with said inputted data;

(i) dispenser means mounted above the surface of said water, and coupled to a control output of said microprocessor means, said dispenser means timed by input from said keyboard means to said microprocessor means in a manner to selectively dispense onto the surface of said water at predetermined time periods; and (j) pump means coupled to a control output of said microprocessor means, and means for operating said pump means over a predetermined time period from data inputted from said keyboard means to said microprocessor.

2. Apparatus as described in claim 1 wherein said temperature measuring means comprises a temperature sensitive thermistor, means for generating a signal output to said thermistor from said microprocessor means in a manner to determine the resistance of said thermistor, said resistance being a measure of the temperature of said water, said measured resistance being compared with said keyboard means input data in said microprocessor means in a manner to operate said temperature control means through a signal to said control means to correct said temperature when said measured resistance indicates a temperature different from said entered data.

3. Apparatus as described in claim 2 wherein said thermistor is mounted at the minimum level of said water in said aquarium and wherein said microprocessor means includes means for determining the rate of change of resistance of said thermistor upon application of said signal output to said thermistor, level warning means, and means for actuating said level warning means if said resistance rate of change exceeds a preprogrammed value.

4. Apparatus according to claim 1 including means for coupling said plurality of control output means and a temperature measuring means to a second tank filled with water, including means for selectively entering data from said program device for either said first or second tank.

* * * * *